(12) United States Patent
Kim

(10) Patent No.: US 9,851,804 B2
(45) Date of Patent: *Dec. 26, 2017

(54) ENVIRONMENT-DEPENDENT DYNAMIC RANGE CONTROL FOR GESTURE RECOGNITION

(71) Applicant: Empire Technology Development LLC, Wilmington, DE (US)

(72) Inventor: Seungil Kim, Seoul (KR)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/297,584

(22) Filed: Jun. 5, 2014

(65) Prior Publication Data

US 2014/0285458 A1  Sep. 25, 2014

Related U.S. Application Data

(63) Continuation of application No. 13/121,791, filed as application No. PCT/US2010/062354 on Dec. 29, 2010, now Pat. No. 8,766,912.

(51) Int. Cl.
    *G06F 3/01* (2006.01)
    *G06F 3/041* (2006.01)

(52) U.S. Cl.
    CPC .................. *G06F 3/017* (2013.01)

(58) Field of Classification Search
    CPC . G06F 3/01; G06F 3/017; G06F 3/018; G06F 3/0304; G06F 3/048; G06F 3/04841
    See application file for complete search history.

(56) References Cited

U.S. PATENT DOCUMENTS

| 5,594,469 A | 1/1997 | Freeman et al. |
| 7,623,115 B2 | 11/2009 | Marks |
| 8,411,963 B2 * | 4/2013 | Luff .................. G06K 9/00771 382/103 |

(Continued)

FOREIGN PATENT DOCUMENTS

| EP | 2333652 A1 | 6/2011 |
| JP | H08315154 A | 11/1996 |

(Continued)

OTHER PUBLICATIONS

Roy, D., "Distributed Multimodal Interaction in a Smart Home Environment", Master's Thesis in Computing Science, 30 ECTS credits Supervisor at CS-UmU: Dipak Surie, Examiner: Per Lindstrom Umea University Department of Computing Science Se-901 87 UMEA, pp. 69 (Jun. 22, 2009).

(Continued)

*Primary Examiner* — Bryan Earles
(74) *Attorney, Agent, or Firm* — Turk IP Law, LLC

(57) ABSTRACT

Technologies are generally described for environment-dependent dynamic range control for gesture recognition. In some examples, user environment including, but not limited to, location, device size, virtual or physical display size, is detected and gesture control range adjusted according to the detected environment. In other examples, a controller user interface or dynamic range status indicator may be adjusted based on the modified gesture recognition range control.

17 Claims, 11 Drawing Sheets

(56) References Cited

U.S. PATENT DOCUMENTS

| | | | |
|---|---|---|---|
| 8,464,160 B2 | 6/2013 | Sakata et al. | |
| 8,490,002 B2* | 7/2013 | Fai | G06F 1/1639 |
| | | | 345/173 |
| 8,527,908 B2* | 9/2013 | Pance | G06F 1/3231 |
| | | | 340/686.6 |
| 8,631,355 B2* | 1/2014 | Murillo | G06F 3/017 |
| | | | 715/863 |
| 8,766,912 B2* | 7/2014 | Kim | 345/156 |
| 2005/0088409 A1 | 4/2005 | Van Berkel | |
| 2009/0085935 A1 | 4/2009 | Yamashita et al. | |
| 2009/0138805 A1* | 5/2009 | Hildreth | G06K 9/00335 |
| | | | 715/745 |
| 2009/0195497 A1 | 8/2009 | Fitzgerald et al. | |
| 2009/0262187 A1 | 10/2009 | Asada et al. | |
| 2009/0325705 A1 | 12/2009 | Filer et al. | |
| 2010/0017758 A1 | 1/2010 | Zotov et al. | |
| 2010/0058252 A1 | 3/2010 | Ko | |
| 2010/0302395 A1* | 12/2010 | Mathe | G06K 9/00342 |
| | | | 348/222.1 |
| 2010/0306712 A1 | 12/2010 | Snook et al. | |
| 2011/0119640 A1* | 5/2011 | Berkes | G06F 3/011 |
| | | | 715/863 |
| 2012/0017172 A1* | 1/2012 | Sheth | G06F 9/4443 |
| | | | 715/800 |
| 2012/0124456 A1* | 5/2012 | Perez | G06Q 30/02 |
| | | | 715/200 |

FOREIGN PATENT DOCUMENTS

| | | |
|---|---|---|
| JP | 2009087145 A | 4/2009 |
| JP | 2009265709 A | 11/2009 |
| JP | 2010127784 A | 6/2010 |
| KR | 100886056 B1 | 2/2009 |
| WO | 2009018161 A1 | 2/2009 |

OTHER PUBLICATIONS

International Search Report and Written Opinion for International Application No. PCT/US2010/062354 dated Mar. 4, 2011.
International Preliminary Report on Patentability for PCT/US2010/062354 filed Dec. 29, 2010, dated Jul. 11, 2013.

* cited by examiner

ENVIRONMENT-DEPENDENT DYNAMIC RANGE CONTROL FOR GESTURE RECOGNITION

CROSS REFERENCE TO RELATED APPLICATIONS

This Application is a continuation under 35 U.S.C. §120 of U.S. patent application Ser. No. 13/121,791 filed on Mar. 30, 2011 and patented as U.S. Pat. No. 8,766,912 on Jul. 1, 2014, which is the U.S. National Stage filing under 35 U.S.C. §371 of International Application No. PCT/US10/62354 filed on Dec. 29, 2010. The disclosures of U.S. patent application Ser. No. 13/121,791 and International Application No. PCT/US10/62354 are hereby incorporated by reference in their entireties.

BACKGROUND

Unless otherwise indicated herein, the materials described in this section are not prior art to the claims in this application and are not admitted to be prior art by inclusion in this section.

Traditional media equipment and computer controlled devices such as computers, televisions, message boards, electronic billboards, and monitoring devices are controlled directly over a user interface using input hardware. Typically, they are directly controlled using input devices such as a mouse, remote control, keyboard, stylus, touch screen, or the like for controlling the device. Since the input devices are integrated with the devices, in order for users to interact with a device, the users need to have direct access to or be in close proximity to such input devices and screens in order to initiate actions on, operate and control the devices through keystrokes on a keyboard, movements of a mouse, and selections on a touchscreen. If the input devices are not directly accessible to the users, the interaction between the user and the devices may be limited and the user may not be able to operate and control the devices, thus limiting the usefulness of the devices.

Recent developments in technology have enabled electronic device to be equipped with motion detection mechanisms to activate the devices, for example, by the waving of a hand or detection of motion in a predefined area. Because device sizes, user distance to a device, and similar circumstances may vary, typical electronic devices controlled by gestures may be commonly configured to detect a larger range of gestures. Depending on the circumstances, however, a user may wish (or need to) use smaller gestures, for example finger gestures instead of hand gestures.

SUMMARY

The present disclosure presents a method for adjusting a dynamic range of gesture recognition. According to some examples, the method may include detecting an environment of a user of a gesture-recognition capable electronic device and adjusting a gesture input dynamic range for the gesture-recognition capable electronic device based on the detected environment of the user.

The present disclosure also describes an apparatus capable of adjusting a dynamic range of gesture recognition. According to some examples, the apparatus may include an image capture device configured to detect gestures, a memory configured to store instructions, and a processor coupled to the memory. The processor may be adapted to execute the instructions, which when executed configure the processor to detect an environment of a user and adjust a gesture input dynamic range based on the detected environment of the user.

The present disclosure further describes a computer-readable storage medium having instructions stored thereon for adjusting a dynamic range of gesture recognition. The instructions may include detecting an environment of a user of a gesture-recognition capable electronic device and adjusting a gesture input dynamic range for the gesture-recognition capable electronic device based on the environment of the user.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The below described and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
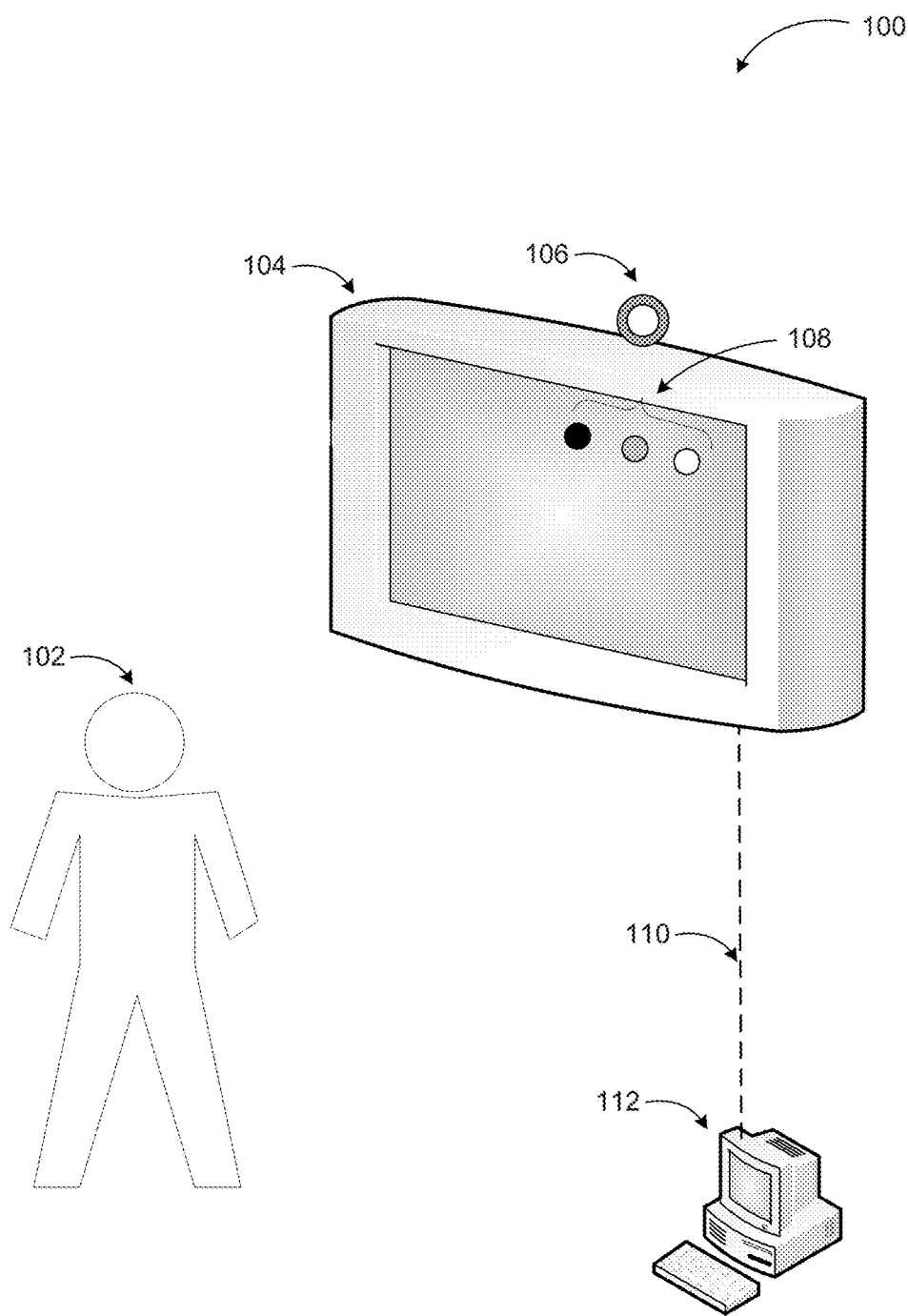
FIG. 1 is a conceptual diagram illustrating one example implementation of an environment-dependent dynamic range control for gesture recognition.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to environment-dependent dynamic range control for gesture recognition.

Briefly stated, dynamic range control may be provided for gesture recognition based on user environment. According to some embodiments, user environment including, but not limited to, location, device size, virtual or physical display size, may be detected and gesture control range may be adjusted according to the detected environment. According to other embodiments, a controller user interface or dynamic range status indicator may be adjusted based on the modified gesture recognition range control.

FIG. 1 is a conceptual diagram illustrating one example implementation of an environment-dependent dynamic range control for gesture recognition in accordance with at least some embodiments described herein. As depicted in a diagram 100, electronic devices such as a computing device 112 may be controlled by gesture recognition instead of or in addition to conventional control mechanisms such as mechanical controls (e.g., keyboard, mouse, etc.), audio controls (e.g., speech recognition), and similar ones.

The computing device 112 may be conductively, optically, or wirelessly coupled (110) to a display device 104. The display device 104 may include an integrated image capture device 106 (e.g., a camera). Alternatively, the image capture device 106 may be a separate device conductively, optically, or wirelessly coupled to the display device 104. In an example implementation, a user 102 may control select functionality of the computing device 112 through gestures. The gestures may be captured by the image capture device 106 and recognized at the computing device 112, which may map them to specific input commands and process accordingly.

The computing device 112 may display control elements 108 to provide feedback to the user 102 and make it easier for the user 102 to perform specific gestures. For example, displayed buttons may be associated with specific commands and a button may be activated upon detecting the user's motion (e.g., with a hand) toward that button. As feedback, a color/shading/size of the button may be modified upon activation indicating to the user 102 that the gesture was successfully recognized.

Figure 2:
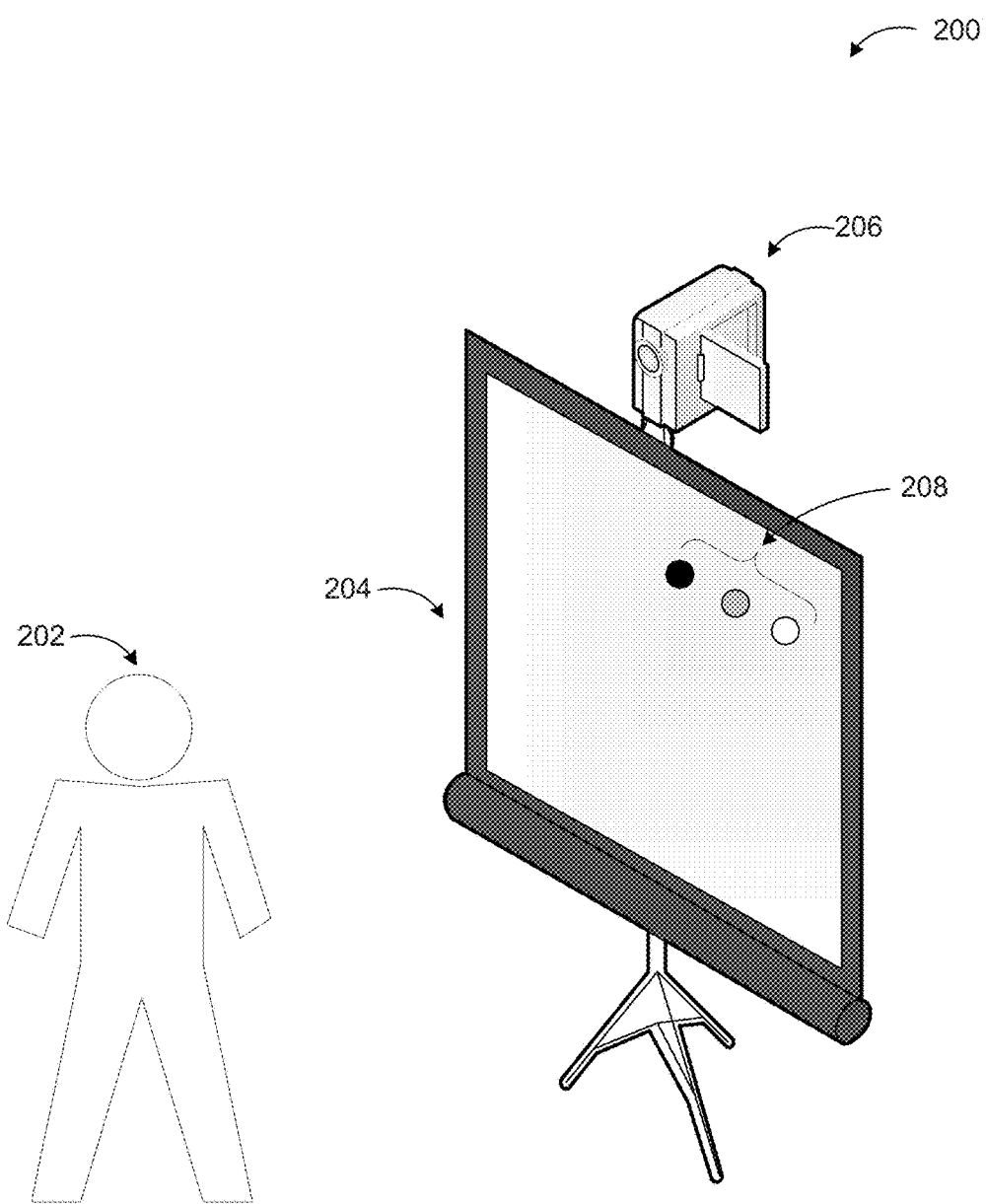
FIG. 2 is a conceptual diagram illustrating another example implementation of an environment-dependent dynamic range control for gesture recognition.

FIG. 2 is a conceptual diagram illustrating another example implementation of an environment-dependent dynamic range control for gesture recognition in accordance with at least some embodiments described herein. As depicted in a diagram 200, gesture-based control is not limited to conventional computing devices such as laptop computers, desktop computers, handheld computers, vehicle-mount computers, smart phones, or similar devices. While the distinction between computing devices and other electronic devices such as household appliances is progressively being blurred by incorporation of special purpose processors and communication capabilities to a wide range of electronic devices, those are still considered in a separate category.

Gesture-based control may also be implemented in a wide variety of electronic devices such as televisions, entertainment systems, Automated Teller Machines (ATMs), or comparable devices. The diagram 200 illustrates a projection display 204 that may be used in a home or public environment to display still or video images. Functionality of the projection display 204 such as power-on/power-off, display characteristics, audio characteristics, etc. may be controlled by recognizing gestures of a user 202. As in FIG. 1, a control user interface with one or more control elements 208 may be presented to ease the user's interaction with the gesture recognition mechanism and provide feedback to the user 202. The gestures may be captured through a video camera 206, which may alternatively be a still image camera, a webcam, or similar image capture device.

As the example implementations in FIGS. 1 and 2 illustrate, the devices employing gesture recognition and the environment, in which they are used, may vary across a broad spectrum. On one end of the spectrum are handheld devices (e.g., a smart phone) with relatively small displays; on the other end are relatively large projection displays or television sets. Similarly, in a home or office environment, a user may be free to use large gestures with hands and arms, while in public environments, the available space and other considerations (e.g., reaction of other people to the gestures) may necessitate the use of smaller gestures such as finger gestures.

In a system according to some embodiments, a user's environment such as display size (virtual or physical) and/or location (public or private) may be detected by the device being controlled by gestures automatically and a dynamic range for gesture recognition adjusted. For example, the range may be modified for smaller gestures in a public place or when the available display is small, and for larger gestures in a private place or when the available display size is large. The detection may be based on location determination (e.g., use of a Global Positioning Service (GPS), a cellular location service, a wireless network location service, etc.), interpretation of video and/or audio signals from the environment (e.g., detection of large number of people in the background or noise levels), or user input. A control user interface associated with gesture recognition may be adjusted in size or arrangement based on the detected environment as well. If no control user interface is provided, a dynamic range indicator may be presented to the user to make the user aware of the change in the dynamic range.

Figure 3:
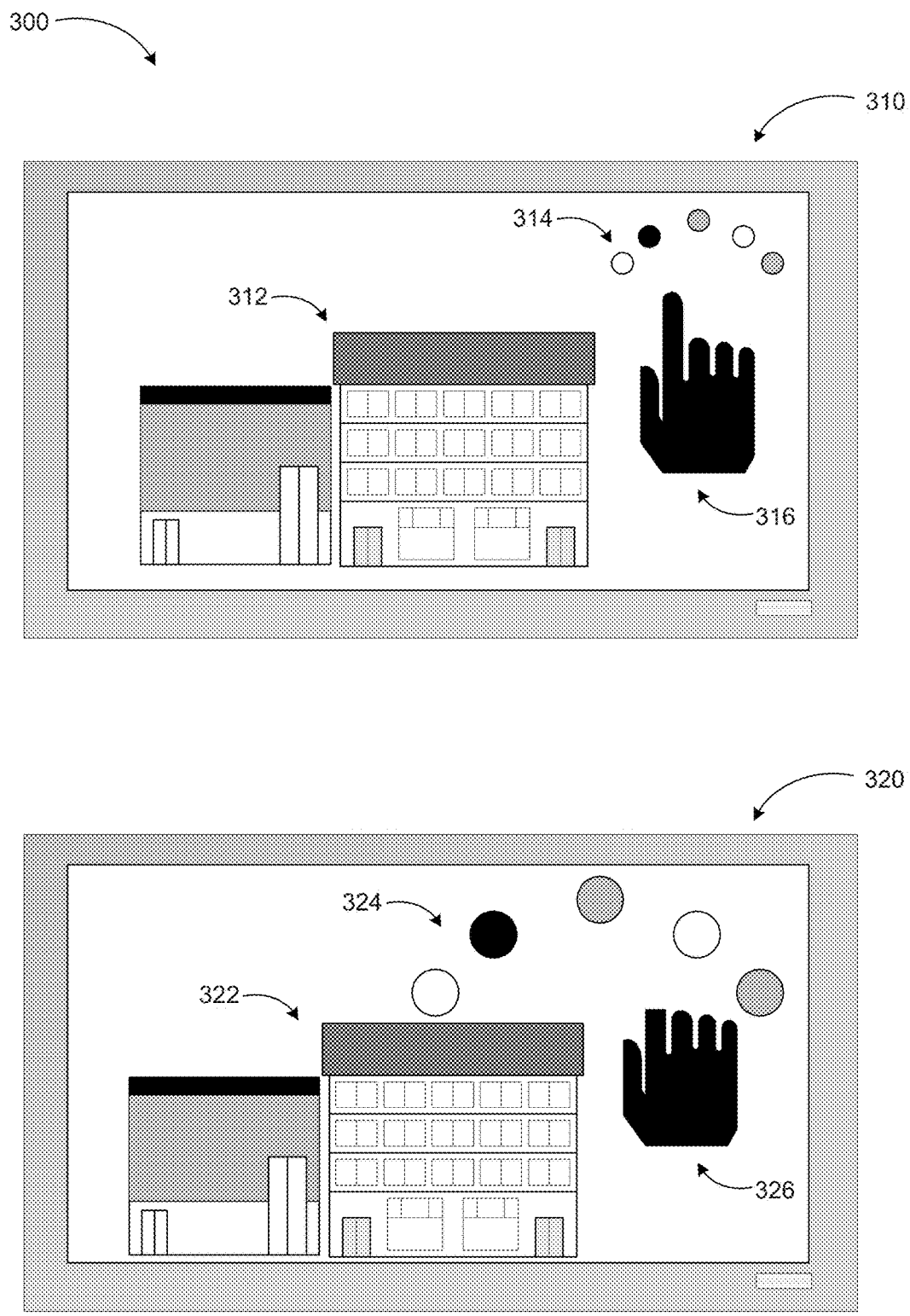
FIG. 3 illustrates adjustment of gesture input controls based on detection of the environment on the same device.

FIG. 3 illustrates adjustment of gesture input controls based on detection of the environment on the same device in accordance with at least some embodiments described herein. A diagram 300 illustrates an example of adjusting dynamic range control of gesture recognition.

A display 310 presents an image 312 (e.g., buildings) and a gesture recognition control user interface 314. The control user interface 314 may include a number of control elements such as buttons, sliding controls, text boxes, and so on. Different color, shading, textual, or graphical schemes may be used to render the interaction user-friendly and to provide feedback to a user. For example, with a relatively smaller control user interface such as the one shown on the display 310, the user may employ finger gestures 316 to select/activate elements of the control user interface 314.

A display 320 presents an image 322 and a larger control user interface 324. In response to detecting the user's environment, a system according to some embodiments may adjust the dynamic range of gesture recognition and a size of the displayed control user interface 324. Thus, the user may now utilize hand gestures 326 instead of finger gestures. In addition to the size, an arrangement of and/or a number of elements within the displayed control user interface 324 may also be modified based on the detected environment and adjusted dynamic range for gesture recognition.

Figure 4:
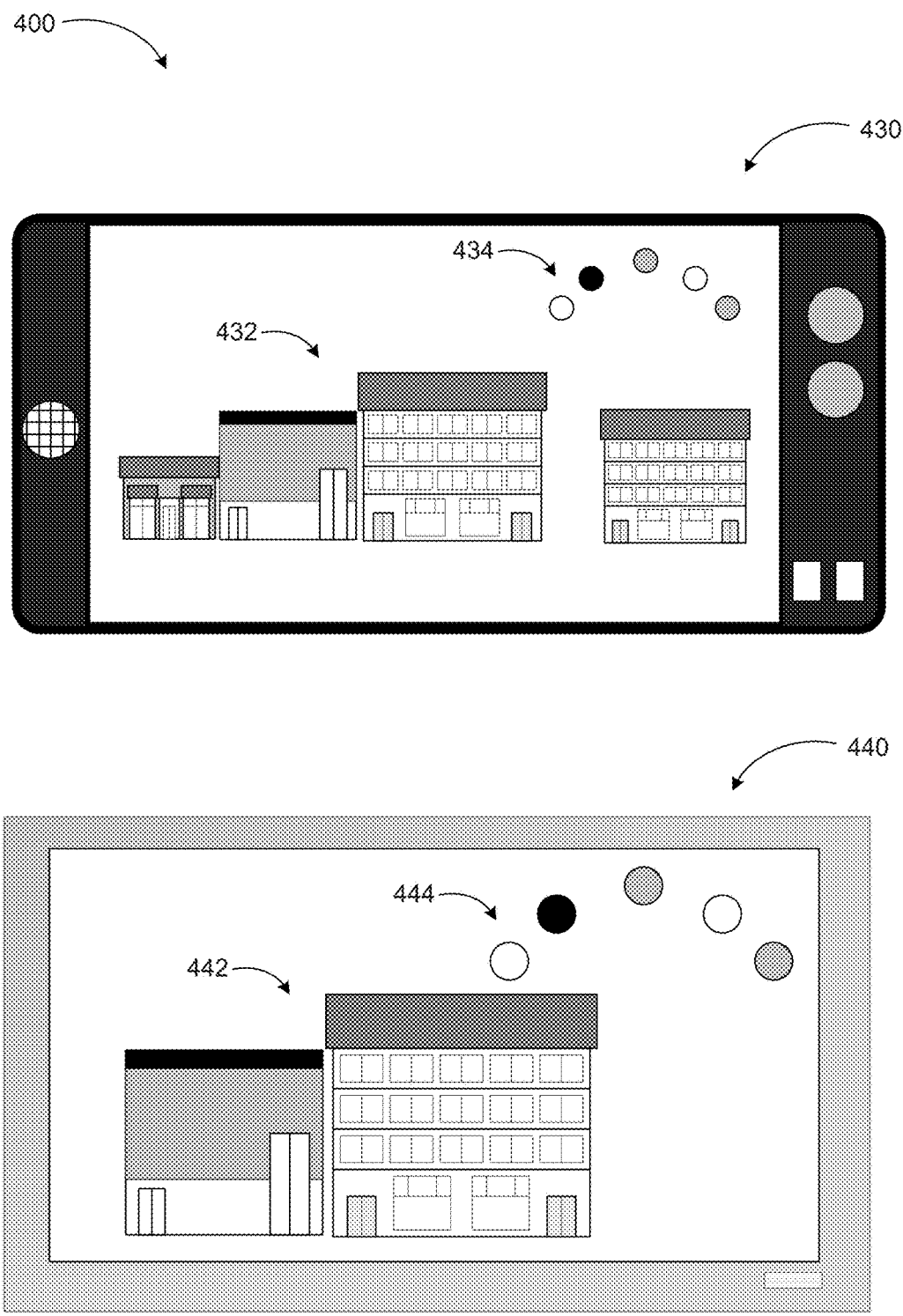
FIG. 4 illustrates adjustment of gesture input controls based on detection of the environment on different devices.

FIG. 4 illustrates adjustment of gesture input controls based on detection of the environment on different devices in accordance with at least some embodiments described herein. A diagram 400 illustrates an example of gesture recognition dynamic range and control user interface adjustment based on device type. It is common for users to switch between computing devices and continue using the same software application. For example, the user may be browsing a web page on their handheld computing device and when they arrive at home or in the office, they may switch to the larger display of their desktop computer and continue browsing the same web page. Similarly, a person may continue viewing the same show on different television sets with different size displays.

A handheld computing device 430 is an example of a smaller form device displaying an image 432 to the user. A control user interface 434 is presented on the handheld computing device 430 for gesture recognition functionality. Due to the size of the device, the control user interface 434 may also be relatively small (e.g., smaller buttons positioned closer to each other).

When the user switches to a larger display device 440 (e.g., monitor of a desktop computer), a similar image 442 may be continued to be displayed, but upon detecting the change in the display environment, the display device 440 may adjust the dynamic range of gesture recognition and at the same time adjust a size and/or arrangement of a control user interface 444 (e.g., larger buttons wider apart from each other).

Figure 5:
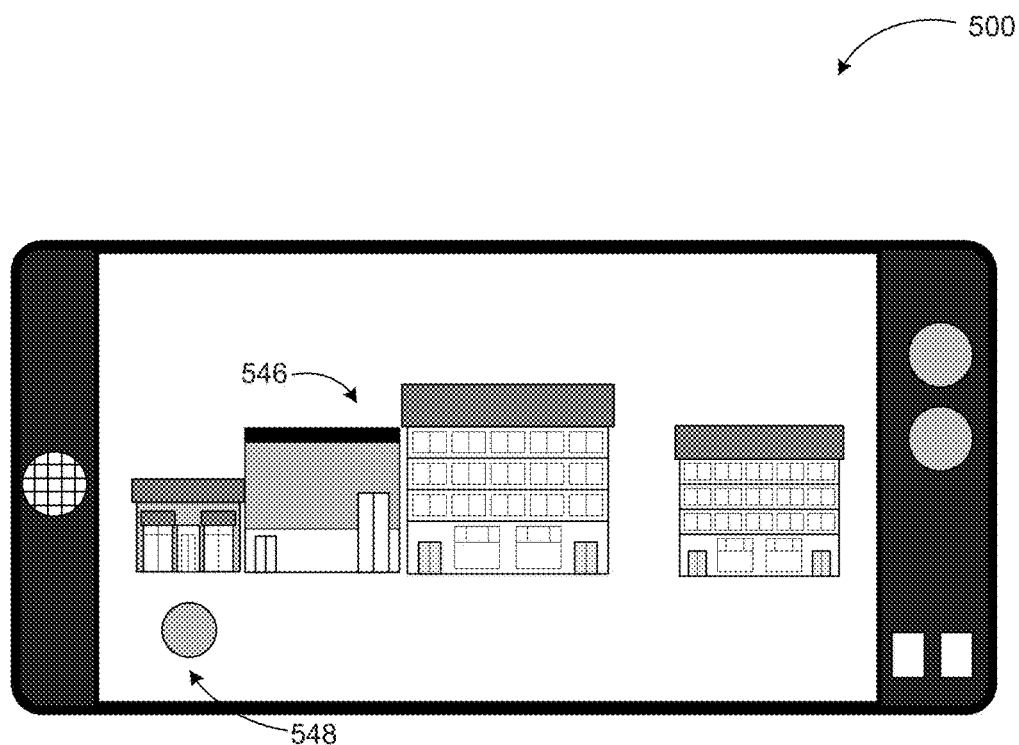
FIG. 5 illustrates an example gesture recognition dynamic range status indicator on a portable computing device.

FIG. 5 illustrates an example gesture recognition dynamic range status indicator on a portable computing device in accordance with at least some embodiments described herein. As depicted in a diagram 500, a control user interface may not always be presented. In such scenarios, a device according to some embodiments may display an indicator 548 for gesture recognition dynamic range. If the user is not informed about the adjusted dynamic range, the accuracy of gesture recognition may be reduced. To prevent that, a graphical or textual indicator such as the button indicator 548 may be displayed in an appropriate place of the display (e.g., under the main displayed image 546).

According to some embodiments, a size, a color, and/or a shading of the displayed button may indicate the current dynamic range for gesture recognition. According to other embodiments, other graphical schemes such as a sliding scale or a combination of two graphical elements (e.g., a distance between to icons) may be used to indicate the current dynamic range.

Figure 6:
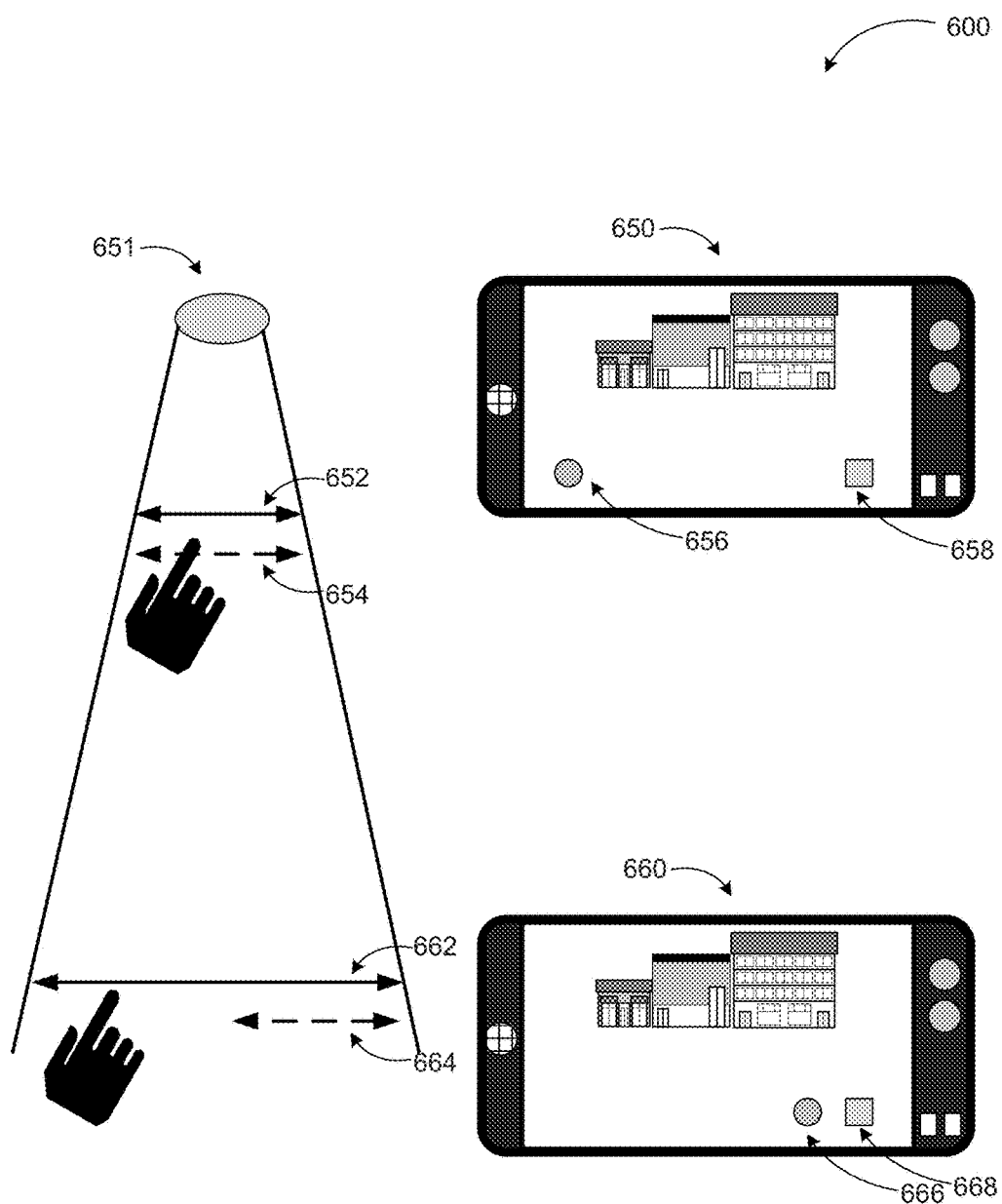
FIG. 6 illustrates an adjustment of gesture UI range in a usage scenario, where the device configuration varies based on the user's location.

FIG. 6 illustrates an adjustment of gesture UI range in a usage scenario, where the device configuration varies based on the user's location in accordance with at least some embodiments described herein. As discussed previously, a system according to embodiments is configured to detect the environment. The detection of the environment may be based on one or more of location determination, detection of user's space, determination of a distance between the image capture device and the user, or any combination thereof.

Location determination may be performed using a location service such as a GPS, cellular, or wireless/wired network service, as well as interpretation of audio and/or video signals (e.g., detection of a public environment, crowds, etc.). The detection of the user's space may include detection of whether or not there are other people near the user, whether there is sufficient room around the user, or the like. The distance between the image capture device capturing the gestures and the user may determine how accurately the gestures are recognized. Therefore, the distance may be detected as a third aspect of the user's environment to adjust the dynamic range for gesture recognition.

For the adjustment of gesture recognition dynamic range, two types of scenarios may be considered: in one scenario, the environment may change, but the device configuration (e.g., size of display, detection capability, etc.) may not; in the other scenario, the device configuration may change along with the environment change.

As depicted in a diagram 600, a user's distance from an image capturing device 651 may influence a range for user movements. For example, if the user is closer to the image capturing device 651, a maximum range for user movements (i.e., gestures) 652 may be approximately the same as a range needed to manage a control user interface 654. According to some embodiments, the dynamic range may be displayed on a controlled device 650 using two indicators 656 and 658.

In a follow-up scenario, the user may arrive at a private location, place the same device on a docking station such that it becomes usable from a larger distance (now a device 660). In this example scenario of the device configuration changing along with the user's environment, a new maximum range for user movements 662 is larger than the previous maximum range for user movements 652, although the range needed to manage a control user interface 664 is the same as before. Thus, the user can use larger gestures (e.g., hand gestures instead of finger movements). This may be indicated on the device 660 with two closer positioned dynamic range indicators 666 and 668.

Thus, in the case where just the environment changes and not the device configuration, a simple reduction of the dynamic range may be sufficient. According to other scenarios, the dynamic range may be increased or expanded. In the case where the device configuration and the environment changes, the factors discussed above (e.g., display size, user's space, distance between camera and user, etc.) may be considered individually or in combination to determine an optimum dynamic range for gesture recognition. The control user interface and/or displayed dynamic range indication may also be adjusted accordingly.

Figure 7:
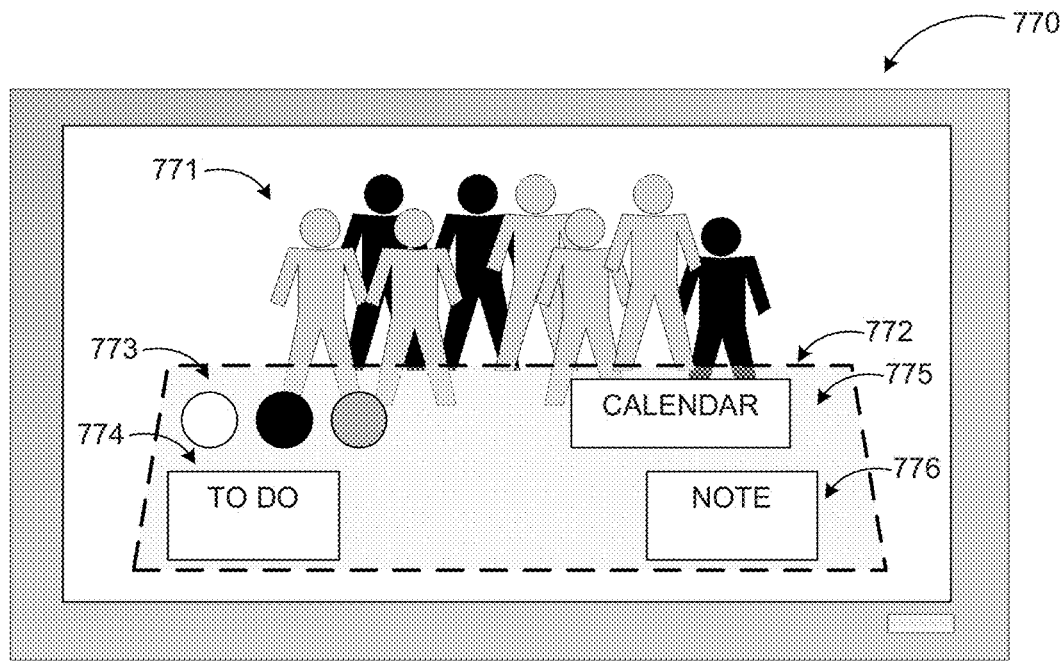
FIG. 7 illustrates an example of gesture-based control UI adjustment depending on the environment of the user.
Figure 7:
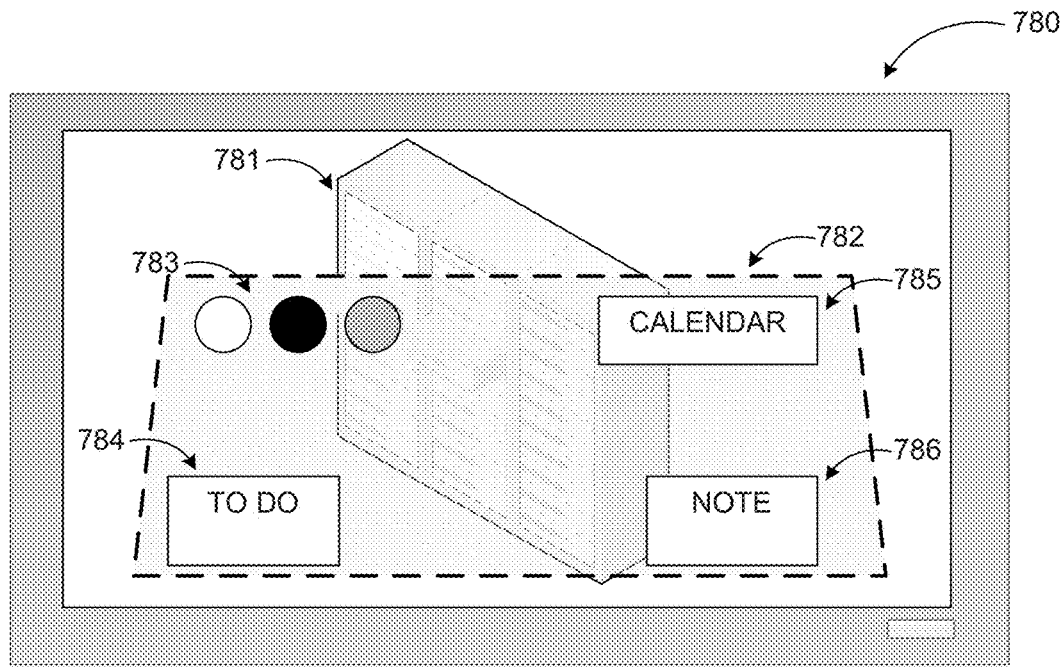

FIG. 7 illustrates an example of gesture-based control UI adjustment depending on the environment of the user in accordance with at least some embodiments described herein. As depicted in FIG. 7, a control user interface for gesture recognition may take many forms. For example, Augmented Reality (AR) based implementations with head-mounted displays (or other displays) are becoming increasingly popular. These semi-transparent displays enable users to see their environment while viewing virtual user interfaces for one or more software applications superimposed on the real scene.

A display 770 depicts an example AR implementation, where the user is in a public location with people 771 in the background and a desktop application user interface 772 superimposed over the real scene. The desktop application user interface 772 may include elements for a to-do list application 774, a calendar application 775, a note taking application 776, and/or other control elements 773. Because the user is in a public location, a size and arrangement of the desktop application user interface 772 may be minimized or configured to allow comfortable viewing of the surroundings as shown on the display 770. The adjustment of the user interface size and/or a dynamic range for gesture recognition (to interact with the elements of the user interface) may be based on environment detection as described herein.

A display 780 depicts a desktop application user interface 782 that is a modified version of the desktop application user interface 772. Upon detecting a change in the user's environment such as detecting a bookcase 781 instead of the people 771 and interpreting it as the user being in a private location, the system may increase a size of the desktop application user interface 782. At least some of the icons representing the to-do list application 784, the calendar application 785, the note taking application 786, and/or the other control elements 783 may also be increased in size or placed differently to provide the user a larger virtual work area.

Along with the increase in size of the desktop application user interface 782, the dynamic range for gesture recognition may also be adjusted to enable the user to employ larger gestures, now that he/she is in a private location.

Figure 8:
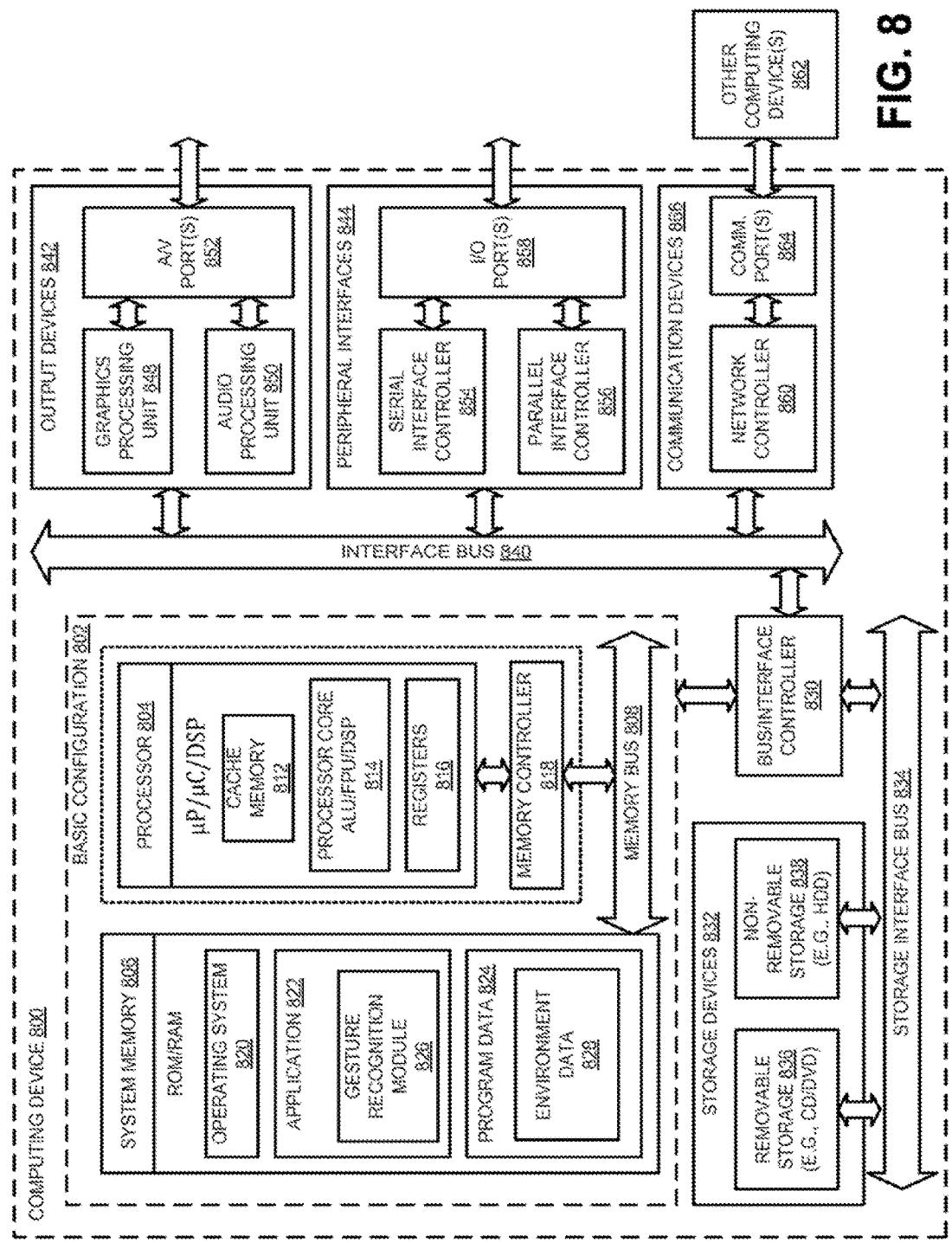
FIG. 8 illustrates a general purpose computing device, which may be used to implement environment-dependent dynamic range control for gesture recognition.

FIG. 8 illustrates a general purpose computing device, which may be used to implement environment-dependent dynamic range control for gesture recognition in accordance with at least some embodiments described herein. In a very basic configuration 802, computing device 800 typically includes one or more processors 804 and a system memory 806. A memory bus 808 may be used for communicating between the processor 804 and the system memory 806.

Depending on the desired configuration, the processor 804 may be of any type including but not limited to a microprocessor (μP), a microcontroller (μC), a digital signal processor (DSP), or any combination thereof. Processor 804 may include one or more levels of caching, such as a level cache memory 812, a processor core 814, and registers 816. The example processor core 814 may include an arithmetic logic unit (ALU), a floating point unit (FPU), a digital signal processing core (DSP core), or any combination thereof. An example memory controller 818 may also be used with the processor 804, or in some implementations, a memory controller 818 may be an internal part of the processor 804.

Depending on the desired configuration, the system memory 806 may be of any type including but not limited to volatile memory (such as RAM), non-volatile memory (such as ROM, flash memory, etc.) or any combination thereof. The system memory 806 may include an operating system 820, an application 822, and program data 824. The application 822 may be any computer application and include a gesture recognition module 826 that is arranged to detect user gestures and employ them as control input for the application 822 and any other processes, methods and functions as discussed above. The program data 824 may include one or more of environment data 828 and similar data as discussed above in conjunction with at least FIG. 1 through 7. This data may be useful for adjusting dynamic range control for gesture recognition as is described herein. In some embodiments, the application 822 may be arranged to operate with the program data 824 on the operating system 820 as described herein. This described basic configuration 802 is illustrated in FIG. 8 by those components within the inner dashed line.

Computing device 800 may have additional features or functionality, and additional interfaces to facilitate communications between the basic configuration 802 and any required devices and interfaces. For example, a bus/interface controller 830 may be used to facilitate communications between the basic configuration 802 and one or more data storage devices 832 via a storage interface bus 834. The data storage devices 832 may be removable storage devices 836, non-removable storage devices 838, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 806, the removable storage devices 836 and the non-removable storage devices 838 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by the computing device 800. Any such computer storage media may be part of the computing device 800.

The computing device 800 may also include an interface bus 840 for facilitating communication from various interface devices (e.g., output devices 842, peripheral interfaces 844, and communication devices 866 to the basic configuration 802 via bus/interface controller 830. The example output devices 842 include a graphics processing unit 848 and an audio processing unit 850, which may be configured to communicate to various external devices such as a display or speakers via one or more A/V ports 852. The example peripheral interfaces 844 include a serial interface controller 854 or a parallel interface controller 856, which may be configured to communicate with external devices such as input devices (e.g., keyboard, mouse, pen, voice input device, touch input device, etc.) or other peripheral devices (e.g., camera, etc.) via one or more I/O ports 858. An example communication device 866 includes a network controller 860, which may be arranged to facilitate communications with one or more other computing devices 862 over a network communication link via one or more communication ports 864.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 800 may be implemented as a portion of a physical server, virtual server, a computing cloud, or a hybrid device that include any of the above functions. The computing device 800 may also be implemented as a personal computer including both laptop computer and non-laptop computer configurations. Moreover, the computing device 800 may be implemented as a networked system or as part of a general purpose or specialized server.

Networks for a networked system including computing device 800 may comprise any topology of servers, clients, switches, routers, modems, Internet service providers, and any appropriate communication media (e.g., wired or wireless communications). A system according to some embodiments may have a static or dynamic network topology. The networks may include a secure network such as an enterprise network (e.g., a LAN, WAN, or WLAN), an unsecure network such as a wireless open network (e.g., IEEE 802.11 wireless networks), or a world-wide network such (e.g., the Internet). The networks may also comprise a plurality of distinct networks that are adapted to operate together. Such networks are configured to provide communication between the nodes described herein. By way of example, and not limitation, these networks may include wireless media such as acoustic, RF, infrared and other wireless media. Furthermore, the networks may be portions of the same network or separate networks.

Figure 9:
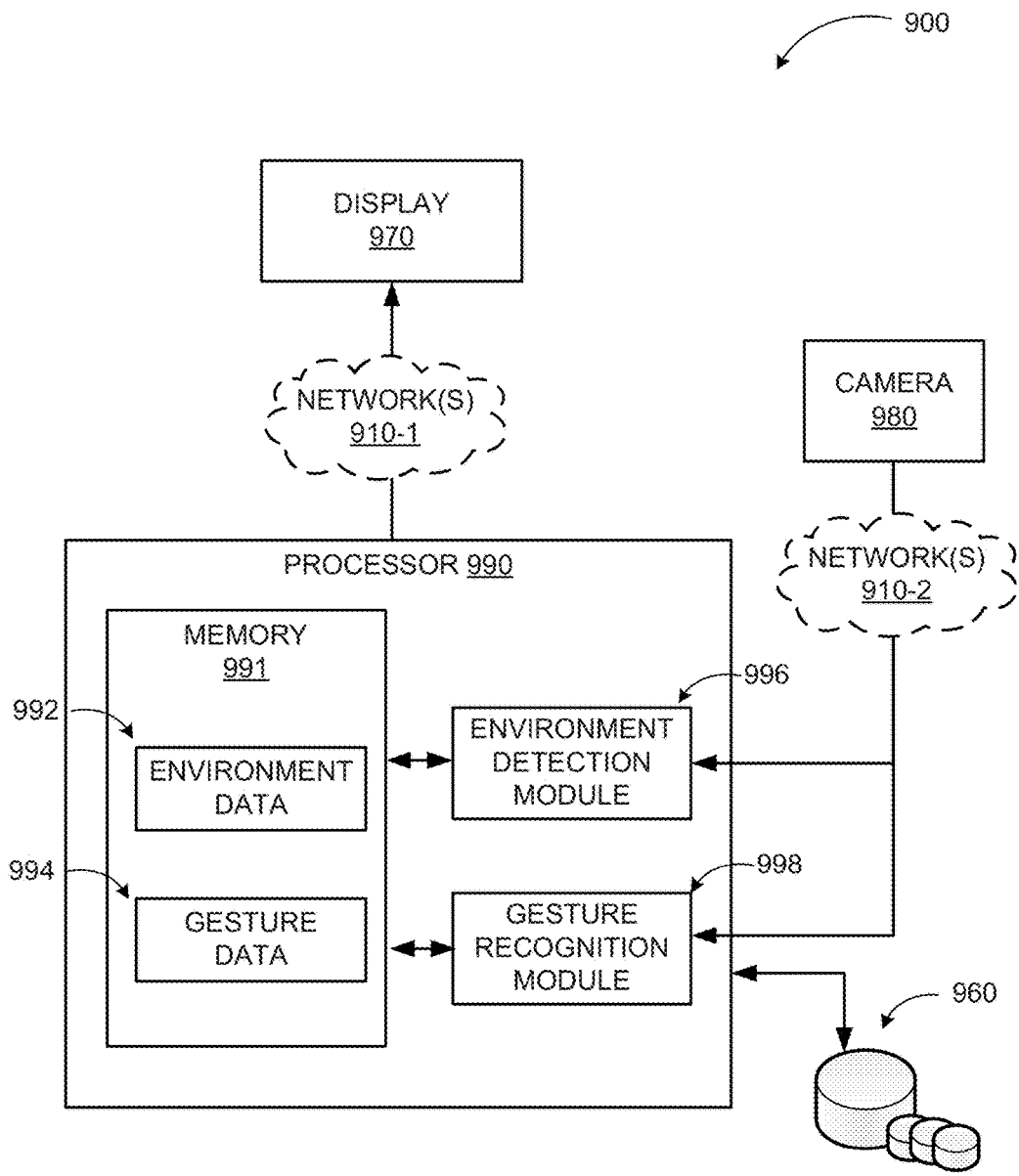
FIG. 9 illustrates a special purpose processor, which may be used to implement environment-dependent dynamic range control for gesture recognition.

FIG. 9 illustrates a special purpose processor, which may be used to implement environment-dependent dynamic range control for gesture recognition in accordance with at least some embodiments described herein. As depicted in a diagram 900, a processor 990 may be part of a computing device or any electronic device (e.g., a television, an ATM console, or comparable ones) capable of being controlled by gesture input.

The processor 990 may include a number of modules such as an environment detection module 996 and a gesture recognition module 998 configured to communicate over network(s) 910-2 with capture devices such as a camera 980 to capture user gestures, user environment, among other things. Upon detection of the environment by the environment detection module 996, the processor 990 may dynamically adjust a gesture input range and/or a control user interface size depending on the detected environment.

A memory 991 may be configured to store instructions for the control modules of the processor 990, which may be implemented as hardware, software, or combination of hardware and software. Some of the data may include, but is not limited to, environment data 992, gesture data 994, or similar information. The processor 990 may be configured to communicate through electrical couplings or through networked communications (e.g., network(s) 910-1) with other devices, for example, a display 970 and/or data stores such as a storage facility 960.

Example embodiments may also include methods. These methods can be implemented in any number of ways, including the structures described herein. One such way is by machine operations, of devices of the type described in the present disclosure. Another optional way is for one or more of the individual operations of the methods to be performed in conjunction with one or more human operators performing some of the operations while other operations are performed by machines. These human operators need not be collocated with each other, but each can be only with a machine that performs a portion of the program. In other examples, the human interaction can be automated such as by pre-selected criteria that are machine automated.

Figure 10:
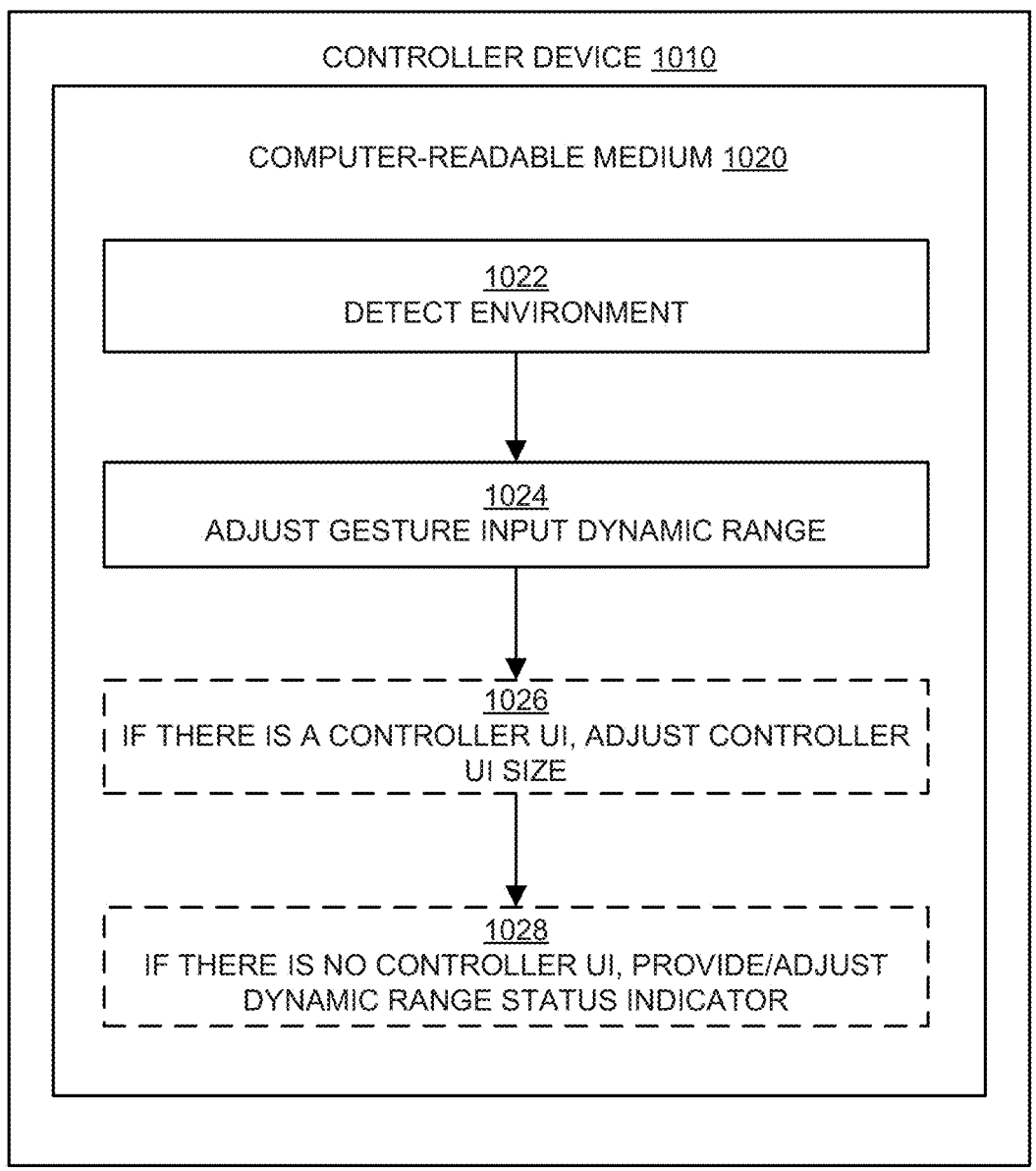
FIG. 10 is a flow diagram illustrating an example method for implementing environment-dependent dynamic range control for gesture recognition that may be performed by a computing device such as device 800 in FIG. 8 or a special purpose processor such as processor 990 of FIG. 9.

FIG. 10 is a flow diagram illustrating an example method for implementing environment-dependent dynamic range control for gesture recognition that may be performed by a computing device such as the device 800 in FIG. 8 or a special purpose processor such as the processor 990 of FIG. 9 in accordance with at least some embodiments described herein. The operations described in blocks 1022 through 1028 may be stored as computer-executable instructions in a computer-readable medium 1020 and executed by a controller device 1010, which may be the computing device 800 in FIG. 8, the special purpose processor 990 of FIG. 9, or a similar device.

A process of employing environment-dependent dynamic range control for gesture recognition may begin with operation 1022, "DETECT ENVIRONMENT." At operation 1022, the environment of the user such as the location, the size of the device and/or display, etc. may be determined based position information, information from a camera, information from a microphone, or comparable sources.

Operation 1022 may be followed by operation 1024, "ADJUST GESTURE INPUT DYNAMIC RANGE." At operation 1024, a gesture recognition setting may be adjusted based on the detected environment. For example, gesture controls may be changed from hand-based controls to finger-based controls or vice versa. Of course, smaller adjustments (e.g., larger hand gestures vs. smaller hand gestures) may also be performed.

Operation 1024 may be followed by optional operation 1026, "IF THERE IS A CONTROLLER USER INTERFACE, ADJUST CONTROLLER USER INTERFACE SIZE." At optional operation 1026, a controller user interface may be adjusted based on the detected environment and/or the adjusted gesture recognition range. For example, a number and/or size of buttons or similar control elements, an arrangement of the control elements may be modified based on the above discussed circumstances.

Optional operation 1026 may be followed by optional operation 1028, "IF THERE IS NO CONTROLLER USER INTERFACE, PROVIDE/ADJUST DYNAMIC RANGE STATUS INDICATOR." At optional operation 1028, one or more icons or similar display elements may be used to provide feedback to the user about the adjusted gesture recognition range if the device does not include a controller user interface.

The operations included in the above described process are for illustration purposes. Environment-dependent dynamic range control for gesture recognition may be implemented by similar processes with fewer or additional operations. In some examples, the operations may be performed in a different order. In some other examples, various operations may be eliminated. In still other examples, various operations may be divided into additional operations, or combined together into fewer operations.

Figure 11:
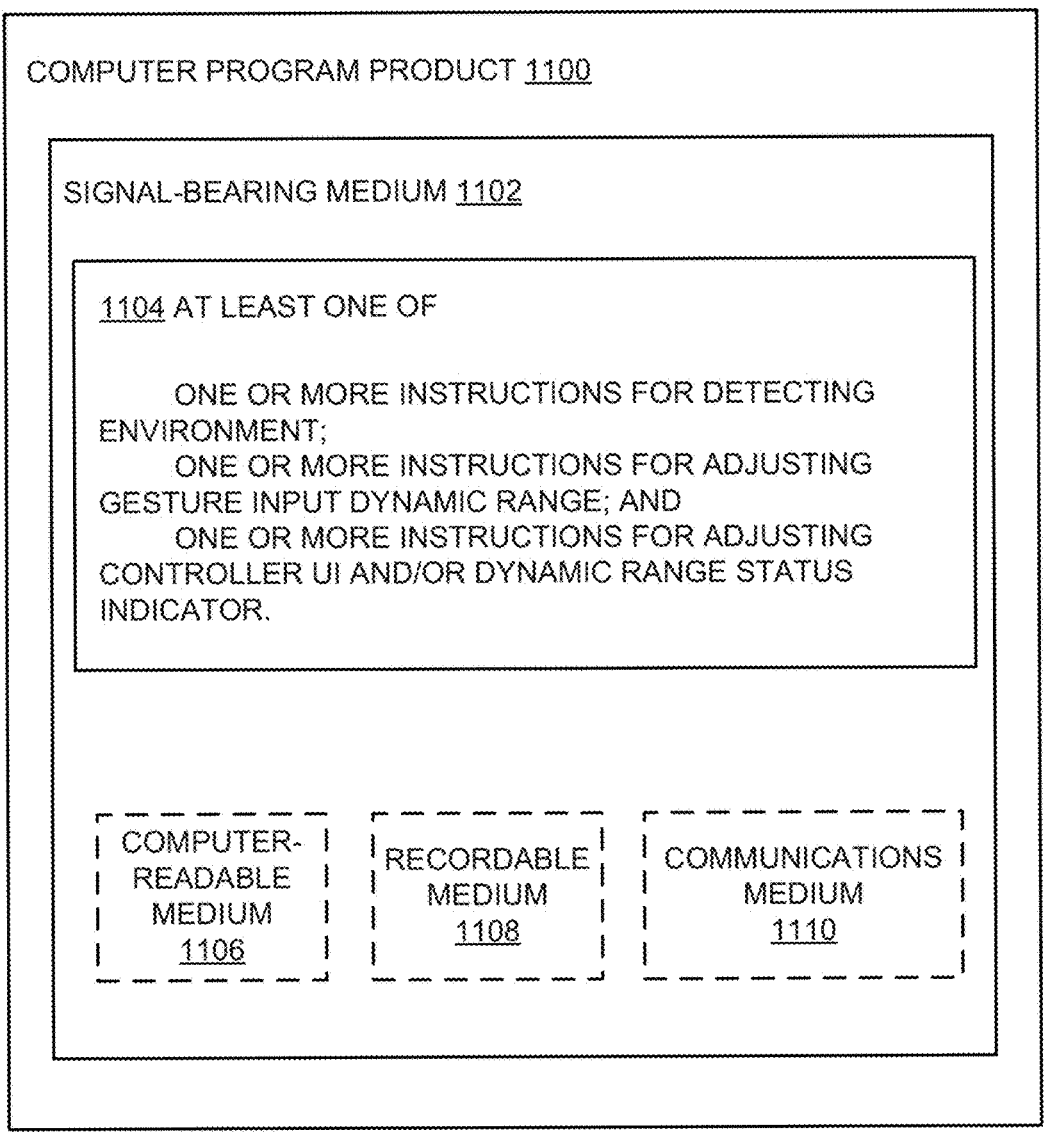
FIG. 11 illustrates a block diagram of an example computer program product, all arranged in accordance with at least some embodiments described herein.

FIG. 11 illustrates a block diagram of an example computer program product, arranged in accordance with at least some embodiments described herein. In some examples, as shown in FIG. 11, a computer program product 1100 may include a signal bearing medium 1102 that may also include machine readable instructions 1104 that, when executed by, for example, a processor, may provide the functionality described above with respect to FIG. 8 or FIG. 9. Thus, for example, referring to the computing device 800, the environment detection module 996 may undertake one or more of the tasks shown in FIG. 11 in response to instructions 1104 conveyed to the processor 804 by the signal bearing medium 1102 to perform actions associated with environment-dependent dynamic range control for gesture recognition as described herein. Some of those instructions may be associated with detecting the environment, adjusting gesture input dynamic range, and adjusting controller user interface and/or dynamic range status indicator.

In some implementations, the signal bearing medium 1102 depicted in FIG. 11 may encompass a computer-readable medium 1106, such as, but not limited to, a hard disk drive (HDD), a Compact Disc (CD), a Digital Versatile Disk (DVD), a digital tape, memory, etc. In some implementations, the signal bearing medium 1102 may encompass a recordable medium 1108, such as, but not limited to, memory, read/write (R/W) CDs, R/W DVDs, etc. In some implementations, the signal bearing medium 1102 may encompass a communications medium 1110, such as, but not limited to, a digital and/or an analog communication medium (e.g., a fiber optic cable, a waveguide, a wired communication link, a wireless communication link, etc.). Thus, for example, the program product 1100 may be conveyed to one or more modules of the processor 990 by an RF signal bearing medium, where the signal bearing medium 1102 is conveyed by a wireless communications medium 1110 (e.g., a wireless communications medium conforming with the IEEE 802.11 standard).

The present disclosure presents a method for adjusting a dynamic range of gesture recognition. According to some examples, the method include detecting an environment of a user of a gesture-recognition capable electronic device and adjusting a gesture input dynamic range for the gesture-recognition capable electronic device based on the detected environment of the user. The environment may include a public location or a private location.

According to other examples, the method may also include adjusting a size of a gesture recognition control user interface (UI) based on the adjusted gesture input dynamic range if the electronic device displays a gesture recognition control UI. The gesture recognition control UI may include a control element and/or an application user interface. The method may further include adjusting the gesture recognition control UI by modifying one or more of a size and/or a position of at least one element of the gesture recognition control UI.

According to further examples, the method may include displaying a gesture input dynamic range indicator that reflects a current gesture input dynamic range if the electronic device does not display a gesture recognition control UI. The method may further include detecting the environment based on one or more of: an audio signal, a video signal, and/or location information. The location information may be obtained from one or more of a Global Positioning Service (GPS) signal, a wireless network signal, and/or a cellular communication signal. The method may also include detecting the environment based on image recognition, a configuration of the electronic device, or a distance between the electronic device and the user.

The present disclosure also describes an apparatus capable of adjusting a dynamic range of gesture recognition. According to some examples, the apparatus may include an image capture device for detecting gestures, a memory configured to store instructions, and a processor coupled to the memory. The processor may be adapted to execute the instructions, which when executed configure the processor to detect an environment of a user and adjust a gesture input dynamic range based on the detected environment of the user. The environment may be a public location or a private location. The processor may further be configured to adjust a size of a gesture recognition control user interface (UI) based on the adjusted gesture input dynamic range if the apparatus displays a gesture recognition control UI.

According to other examples, the gesture recognition control UI may include a control element and/or an application user interface, and the processor may adjust the gesture recognition control UI by modifying one or more of a size and/or a position of at least one element of the gesture recognition control UI. The processor may also display a gesture input dynamic range indicator that reflects a current gesture input dynamic range if the electronic device does not display a gesture recognition control UI.

According to further examples, the processor may detect the environment based on one or more of: an audio signal, a video signal, and/or a location information, where the apparatus may further include at least one communication module capable of obtaining the location information from a Global Positioning Service (GPS) signal, a wireless network signal, or a cellular communication signal. The apparatus may also include one or more of a microphone to capture audio signals and a camera to capture video signals from the environment in order to determine a type of the environment.

The processor may detect the environment based on one or more of: image recognition, a configuration of the apparatus, a type of the apparatus, and/or a distance between the user and the apparatus. Furthermore, the apparatus may be a desktop computer, a laptop computer, a handheld computer, a vehicle-mount computer, a smart phone a television monitor, a projection device, or a display coupled to a computing device.

The present disclosure further describes a computer-readable storage medium having instructions stored thereon for adjusting a dynamic range of gesture recognition. The instructions may include detecting an environment of a user of a gesture-recognition capable electronic device and adjusting a gesture input dynamic range for the gesture-recognition capable electronic device based on the environment of the user, which may be a public location or a private location.

The instructions may also include adjusting a size of a gesture recognition control user interface (UI) based on the adjusted gesture input dynamic range if the electronic device displays a gesture recognition control UI, where the gesture recognition control UI includes a control element and/or an application user interface. According to other examples, the instructions may further include adjusting the gesture recognition control UI by modifying one or more of a size and/or a position of at least one element of the gesture recognition control UI, and displaying a gesture input dynamic range indicator that reflects a current gesture input dynamic range if the electronic device does not display a gesture recognition control UI. The environment may be detected based on one or more of: an audio signal, a video signal, and/or location information. The environment may also be detected based on one or more of image recognition, a configuration of the electronic device, a type of the electronic device, and/or a distance between the user and the electronic device.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, materials, and configurations, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communication link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control modules (e.g., adjusting gesture input dynamic range).

A typical data processing system may be implemented utilizing any suitable commercially available components, such as those typically found in data computing/communication and/or network computing/communication systems. The herein described subject matter sometimes illustrates different components contained within, or coupled with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to adjust a gesture input dynamic range of a gesture recognition in an apparatus, the method comprising:
    detecting an environment of the apparatus;
    identifying, based on at least a detected number of people in a background of a user and a noise level, the environment as one of a private environment and a public environment;
    adjusting, based on the environment of the apparatus, the gesture input dynamic range for the apparatus;
    displaying a recognition control user interface (UI) of the apparatus;
    adjusting the recognition control UI of the apparatus by modifying one or more control elements of the recognition control UI of the apparatus, wherein adjusting the recognition control UI is based on one or more of: the environment, a size of the apparatus, and a type of the apparatus, wherein modifying the one or more control elements of the recognition control UI of the apparatus includes modifying a position of the one or more control elements, wherein the one or more control elements indicates the gesture input dynamic range, and wherein modifying the position of the one or more control elements comprises:
        positioning the one or more control elements wider apart from each other, in response to the user being in the private environment or the size of the apparatus being large, and
        positioning the one or more control elements closer to each other, in response to the user being in the public environment or the size of the apparatus being small;
    determining whether the recognition control UI is displayed on a display screen of the apparatus;
    in response to a determination that the recognition control UI is absent on the display screen of the apparatus, displaying one or more display elements to indicate the adjusted gesture input dynamic range; and
    capturing an input through a gesture input.

2. The method of claim 1, wherein adjusting the gesture input dynamic range includes:
    in response to the identification of the environment as the public environment, adjusting the gesture input dynamic range for a smaller gesture; and
    in response to the identification of the environment as the private environment, adjusting the gesture input dynamic range for a larger gesture.

3. The method of claim 1, wherein adjusting the gesture input dynamic range includes adjusting the gesture input dynamic range for one of a finger gesture and a hand gesture.

4. The method of claim 1, wherein adjusting the gesture input dynamic range includes adjusting the gesture input dynamic range for one of a smaller hand gesture and a larger hand gesture.

5. The method of claim 1, wherein detecting the environment of the apparatus includes detecting the environment based on one or more of an image recognition and a distance between the apparatus and the user.

6. The method of claim 1, further comprising:
    in response to a change in the environment, modifying a configuration of the apparatus to determine the gesture input dynamic range in the changed environment.

7. The method of claim 1, wherein modifying the one or more control elements of the recognition control UI of the apparatus further includes modifying one or more of: a textual scheme of the one or more control elements, a graphical scheme of the one or more control elements, a color of the one or more control elements, a shading of the one or more control elements, and a size of the one or more control elements.

8. The method of claim 1, wherein adjusting the gesture input dynamic range includes:
    in response to an identification of the environment as the private environment, adjusting the gesture input dynamic range for a hand gesture; and
    in response to another identification of the environment as the public environment, adjusting the gesture input dynamic range for a finger gesture.

9. An apparatus to adjust a gesture input dynamic range of a gesture recognition, the apparatus comprising:
    a display device that includes a touch screen and that is configured to detect a touch input;
    an image capture device coupled to the display device; and
    a processor coupled to the display device and the image capture device, the processor configured to perform or control performance of operations to:
        detect an environment of the apparatus while in operation;

identify, based on at least a detected number of people in a background of a user and a noise level, the environment as one of a private environment and a public environment;

adjust, based on the environment, the gesture input dynamic range for the apparatus;

display a recognition control user interface (UI) of the apparatus;

adjust the recognition control UI of the apparatus by modification of a position of one or more control elements of the recognition control UI, wherein the adjustment of the recognition control UI is based on one or more of: the environment, a size of the apparatus, and a type of the apparatus, wherein the one or more control elements indicate the gesture input dynamic range, and wherein the modification of the position of the one or more control elements comprises:

position the one or more control elements wider apart from each other, in response to the user being in the private environment or the size of the apparatus being large, and position the one or more control elements closer to each other, in response to the user being in the public environment or the size of the apparatus being small;

determine whether the recognition control UI is displayed on the touch screen of the apparatus;

in response to a determination that the recognition control UI being absent on the touch screen of the apparatus, instruct the display device that includes the touch screen to display one or more display elements to indicate the adjusted gesture input dynamic range; and capture an input through a gesture input.

10. The apparatus of claim 9, wherein the processor is further configured to:

provide feedback through the display device to indicate the adjusted gesture input dynamic range.

11. The apparatus of claim 9, wherein the apparatus further comprises a communication module and an audio input module, and wherein the processor is configured to detect the environment of the apparatus based on one or more of: a captured audio signal, a captured image, and a location information obtained from one of: a global positioning service (GPS) signal, a wireless network signal, and a cellular communication signal.

12. The apparatus of claim 9, wherein to adjust the gesture input dynamic range, the processor is configured to:

in response to the identification of the environment as the public environment, adjust the gesture input dynamic range for a smaller gesture; and in response to the identification of the environment as the private environment, adjust the gesture input dynamic range for a larger gesture.

13. The apparatus of claim 9, wherein the apparatus comprises one of: a desktop computer, a laptop computer, a handheld computer, a vehicle-mount computer, a smart phone, a television monitor, a projection device, and the display device coupled to a computing device.

14. An input recognition module coupled to a display device and configured to adjust a gesture input dynamic range of a gesture recognition, the input recognition module comprising:

a memory configured to store instructions; and a processor coupled to the memory, wherein the processor is configured to execute the instructions, which, in response to execution by the processor, cause the processor to perform or control performance of operations to:

detect an environment of the display device while in operation;

identify, based on at least a detected number of people in a background of a user and a noise level, the environment as one of a private environment and a public environment;

adjust, based on the environment, the gesture input dynamic range of the display device;

display a recognition control user interface (UI);

adjust the recognition control UI of the display device by modification of a position of one or more control elements of the recognition control UI, wherein the adjustment of the recognition control UI is based on one or more of: the environment, a size of the display device, and a type of the display device, wherein the one or more control elements indicate the gesture input dynamic range, and wherein the modification of the position of the one or more control elements comprises:

position the one or more control elements wider apart from each other, in response to the user being in the private environment or the size of the display device being large, and position the one or more control elements closer to each other, in response to the user being in the public environment or the size of the display device being small;

determine whether the recognition control UI is displayed on the display device;

in response to a determination that the recognition control UI is absent on the display device, display one or more display elements to indicate the adjusted gesture input dynamic range; and capture an input through a gesture input.

15. The input recognition module of claim 14, wherein the processor is further configured to:

detect a switch to a new display device by the user.

16. The input recognition module of claim 15, wherein the processor is further configured to:

increase, based on the gesture input dynamic range, a size of the one or more control elements of the recognition control UI.

17. The input recognition module of claim 15, wherein the processor is further configured to:

decrease, based on the gesture input dynamic range, a size of the one or more control elements of the recognition control UI.

* * * * *